United States Patent

[11] 3,601,607

[72] Inventors: Gerald J. Wasserburg, Altadena; Curtis A. Bauman, La Crescenta; Emil V. Nenow, La Crescenta; Dimitri A. Papanastassiou, Pasadena, all of, Calif.
[21] Appl. No. 833,069
[22] Filed June 13, 1969
[45] Patented Aug. 24, 1971

[54] STEP-SCANNING SYSTEM FOR MASS SPECTROMETER
15 Claims, 3 Drawing Figs.

[52] U.S. Cl. .................................................. 250/41.9 D, 250/41.9 ME, 235/151.35
[51] Int. Cl. .................................................. B01d 59/44
[50] Field of Search .................................... 250/41.9 D, 41.9 ME, 41.9 R; 235/151.35

[56] References Cited

UNITED STATES PATENTS

| 3,333,090 | 7/1967 | Neer | 235/151.35 |
| 3,342,991 | 9/1967 | Kronenberger | 250/41.9 D |
| 3,416,073 | 12/1968 | Gutow, Jr. | 250/41.9 ME |

OTHER REFERENCES

Recorder Chart to Punch Card Converter and Computer Programme for Isotopic Analysis by Mass Spectrometry by Cassie et al. Jour. Sci. Instr. 1966 Vol. 43, pp. 283–288.

Mass Marker for AEI Mass Spectrometer MSZH by Tromp et al. Jour. Sci. Instr. 1967 Vol. 44, pp. 209–211.

Applications of Digital Recording to Simultaneous Collection in Mass Spectrometry by McCullough et al. Review of Sci. Instr. Aug. 1965 Vol. 38 No. 8 pp. 1132–1130.

Primary Examiner—James W. Lawrence
Assistant Examiner—D. C. Nelms
Attorneys—Samuel Lindenberg and Arthur Freilich ABSTRACT: A single-focusing, 60° sector magnet mass spectrometer constructed with symmetric conjugate foci calculated from fringe field data and corresponding to a beam deflection of 68° is provided with a programmable magnetic field to step scan spectral lines and "zero" lines on both sides of each spectral line. A rotating coil probe in the magnetic field, and a stationary coil around a magnetic pole face used to provide the field, are employed as field magnitude and time-rate-of-change sensors for a current nulling system. The nulling system cooperates with an automatic step-scan programmer to set the magnetic field to 3N values, where N is the number of spectral lines to be step scanned, and the successive values correspond to the centers of spectral lines and "zeros" on both sides of each spectral line. The programmer selects a reference voltage for each spectral line which is compared with an induced voltage in the rotating coil. The difference drives the electromagnet power supply to rapidly change the field. The change induces a rate signal in the stationary coil to produce a damping signal for the nulling system. At each step, a data acquisition system records in digital form a value proportional to ion current, scale factor, and the integrating time for that value to be developed through an integrating digital voltmeter. A computer then receives the data for later analysis.

INVENTORS
G. J. WASSERBURG
E. V. NENOW
C. A. BAUMAN
D. A. PAPANASTASSIOU

*Lindenberg & Freilich*
ATTORNEYS

INVENTORS
G. J. WASSERBURG
E. V. NENOW
C. A. BAUMAN
D. A. PAPANASTASSIOU

BY: Lindenberg & Freilich
ATTORNEYS

STEP-SCANNING SYSTEM FOR MASS SPECTROMETER

ORIGIN OF THE INVENTION

The invention described herein was made in the course of or under a grant from the National Science Foundation, an agency of the United States Government.

BACKGROUND OF THE INVENTION

This invention relates to data acquisition systems for mass spectrometers, and more particularly to a system for expediting the acquisition of data by step scanning with a magnetic field and digitizing the spectrum data.

The limitations of analog strip recording of data in measuring the relative isotopic abundance of elements in small samples has been recognized by P. E. Mc~eland et al., who describe in The Review of Scientific Instruments, Vol. 38, No. 6, pages 760 to 764, a semiautomatic data-collection system for mass spectrometers with digital output and a linear magnetic field sweep for scanning mass peaks selected by programming appropriate step changes in the ion acceleration and deflection voltages. It would be desirable to provide a digital spectrometer control system which avoids all linear scanning of peaks and fast step scanning from peak to peak for faster data acquisition. In the past, step scanning of a magnetic field of a mass spectrometer has been accomplished from only one peak to a second peak due to hysteresis effects in attempting to step scan to a third and subsequent peaks of a spectrum.

SUMMARY OF THE INVENTION

The present invention employs a magnetic field control system which monitors the flux locally to operate a mass spectrometer in a step-scan mode of operation. Step scanning in that manner permits a greater percentage of time to be spent integrating the ion beam intensity and reduces errors due to ion beam instability. The magnetic field control system is programmed to 3N values corresponding to the centers of N spectral lines or peaks and zeros on either side of each of the peaks. For each of the peaks, the magnetic field has a value $H_k$ at the center (where $k$ is an integer from 1 to 9 identifying the peak) set by selecting a reference voltage and increasing the electromagnet power supply until the voltage induced in a coil rotating in the magnetic field equals the reference voltage. A stationary coil around the electromagnet pole face provides a rate signal for damping oscillations in the difference between the reference signal and the induced signal. The reference signal is provided by an AC generator driven by the same motor which drives the rotating coil in the magnetic field. Preset offsetting voltages are effectively added to the reference voltage for the magnetic field values $H_k - H'_k$ and $H_k + H''_k$, where $H'_k$ and $H''_k$ are small increments subtracted from and added to the peak selecting field for background beam integration at "zeros" on either side of the peak selected. An integration time counter and integrating digital voltmeter are started in response to a sensor of a zero difference between the reference voltage and the induced voltage in the rotating coil. At the end of the integrating time interval, data comprising the digital output of the integrating digital voltmeter, scale factor and the time interval itself are transmitted to a digital memory.

The novel features considered characteristic of the invention are set forth with particularity in the appended claims. The invention will best be understood from the following description with reference to the accompanying drawings.

DESCRIPTION OF THE PREFERRED EMBODIMENTS

Figure 1:
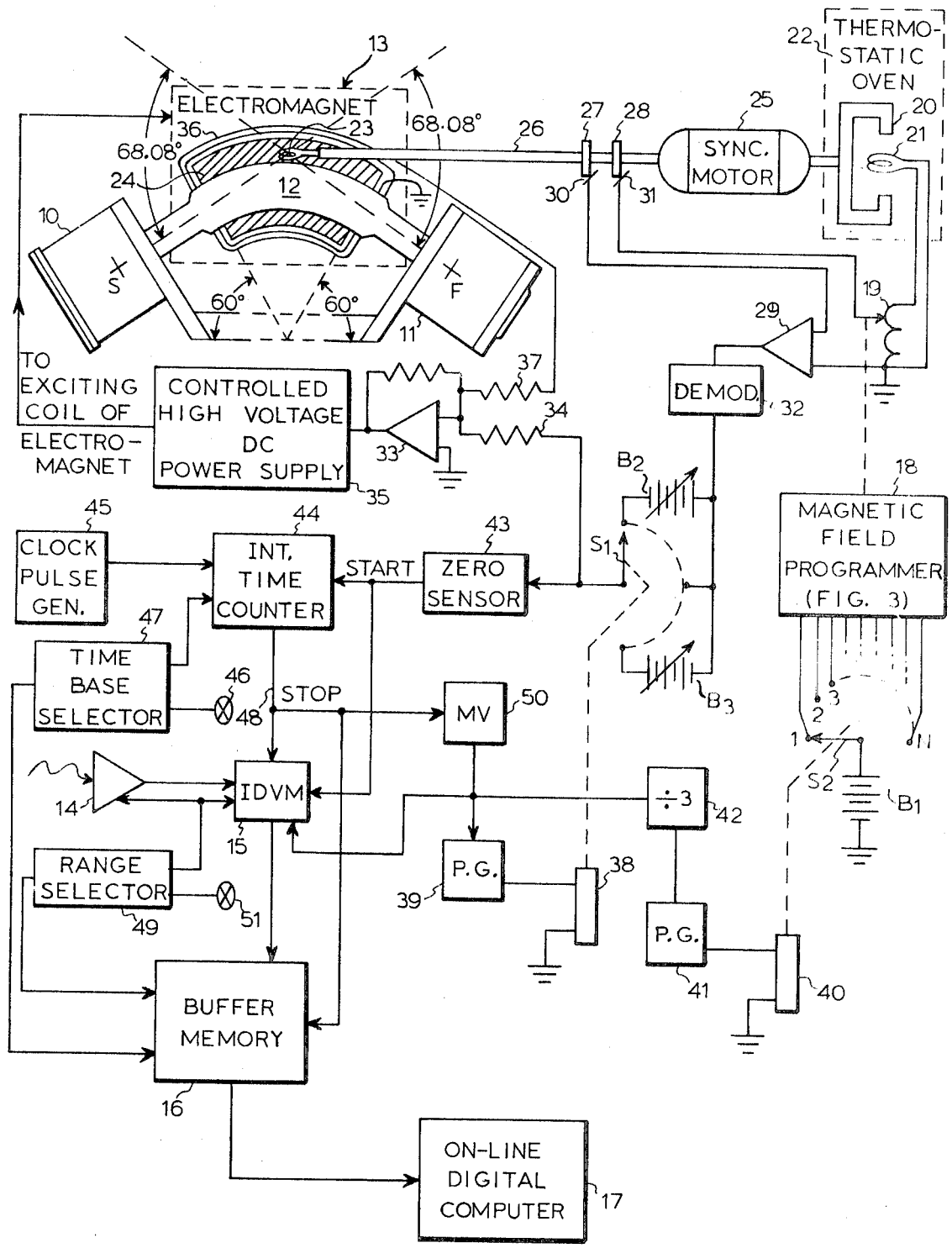
FIG. 1 is a schematic diagram of an exemplary magnetic field programming and data acquisition system for a mass spectrometer in accordance with the present invention.

Referring to the drawings, FIG. 1 illustrates a single focusing, 30.48 cm. radius, 60° sector magnet mass spectrometer having symmetric conjugate foci calculated from fringe field data and corresponding to a beam deflection of 68.08°. However, it should be understood that the present invention is not limited thereto.

The spectrometer comprises an ion beam source pot 10 connected to an ion collector pot 11 through a beam deflection chamber 12 where the paths of the ions are deflected by a magnetic field that is provided in the form of an electromagnet (represented generally by a dotted line block) 13. Thus all ions having the same mass value are focused at a common point F on a plane having a slit. The positive ion current passing through the slit is collected and amplified by an electrometer 14 in the usual manner.

To scan a mass spectrum, the magnetic field is varied by changing the current of the electromagnet 13. In the past, the field has been varied linearly such that the output signal of the electrometer 14 varies to produce peaks, each peak corresponding to a mass number. A suitable digital device, such as an integrating digital voltmeter 15, is employed to convert the output signal of the electrometer 14 to a digital form. In that manner digital data collection techniques may be employed, as by effectively sampling the electrometer output and recording the sample values in digital form in a buffer memory 16. The data could then be plotted, but it is preferably analyzed automatically by a stored-program digital computer 17.

The present invention expedites the scanning process by slewing from one spectral line or mass peak to the next and measuring the "zeros" or valleys on both sides of each peak. Thus, for each mass number, three ion current measurements are made, namely the ion current at the center of the peak and reference or background ion current in valleys on each side of the peak. Since isotopes of some mass numbers may not be present in some samples, it is desirable to slew past the missing spectral lines or peaks.

The spectral lines are scanned by varying the magnetic field of the electromagnet 13 in a stepwise fashion through automatic actuation of switches shown as stepping switches $S_1$ and $S_2$ for simplicity, although in practice each is preferably implemented as a ring counter using conventional electronic devices. At each position of the stepping switch $S_2$, a set of binary coded switches in a programmer 18 are energized to select a fraction of a reference AC voltage from a ratio transformer 19 comprising an autotransformer adapted to have its primary-to-secondary turn ratio selected in response to the coded switches in the programmer 18. The ratio transformer 19 is illustrated as an inductor having a variable tap positioned by the programmer 18, but in practice is preferably an autotransformer having a plurality of output taps spaced to provide a plurality of predetermined turn ratios (reference voltages) from which a selection is made by the energized binary coded switches in the programmer 18. For example, the taps may be selected by means of a multistage relay selecting tree. The relays are selectively energized by the binary code produced by the programmer in response to the position of the stepping switch as will be described more fully hereinafter with reference to FIG. 3. In that manner, current from a battery $B_1$ is directed to predetermined solenoids of the relay selecting tree for each position of the switch $S_2$ in accordance with positions of coding switches manually set in order to select a unique tap of the autotransformer.

To generate the primary voltage (EMF) for the ratio transformer 19, a permanent reference magnet 20 is rotated at a constant rate (e.g. 1800 r.p.m.) around a stationary coil 21. For stability, the magnet 20 and coil 21 are placed in a thermostatic oven represented by a dotted-line block 22.

A second coil 23 is rotated in the air gap of the electromagnet 13. For simplicity, only one pole 24 is shown; the other is positioned on top of the chamber 12. In order that the amplitudes of the AC voltages induced in the coils 21 and 23 may be compared, a single synchronous motor 25 is employed to drive both the magnet 20 and the coil 23; otherwise phase drift between the two voltages could occur and present a problem.

In order for the voltage induced in the coil 23 to be directly proportional to the magnetic field effective on the ion beam in the chamber 12, a shaft 26 connecting the coil 23 to the motor 25 is placed tangent to the chamber 12 with the coil 23 at least one magnetic-gap width inside the edge of the pole 24. Leads from the coil 23 pass through the shaft 26 to rings 27 and 28. The coil 23 is connected between an amplifier 29 and the transformer 19 through suitable brushes 30 and 31 with a 180° phase relationship such that the amplifier 29 will transmit to a demodulator 32 an AC voltage that is equal to the difference between the voltage induced in the coil 23 and the voltage across the secondary winding of the transformer 19.

When a new peak is selected by the programmer 18, a new fraction of the reference voltage corresponding to a new magnetic field value is selected and compared with the voltage induced in the coil 23. The difference is amplified and converted to a DC error signal by the demodulator 32. The error signal is applied to an operational amplifier 33 through the switch $S_1$ and a summing resistor 34. The output of the amplifier 33 is applied to the voltage control circuit of a high voltage DC power supply 35 which energizes the exciting coil (not shown) of the electromagnet 13. In that manner, the current in the electromagnet 13 changes in the signified direction at a fast rate corresponding to 500 gauss/second for slewing from one peak to the next.

Figure 2:
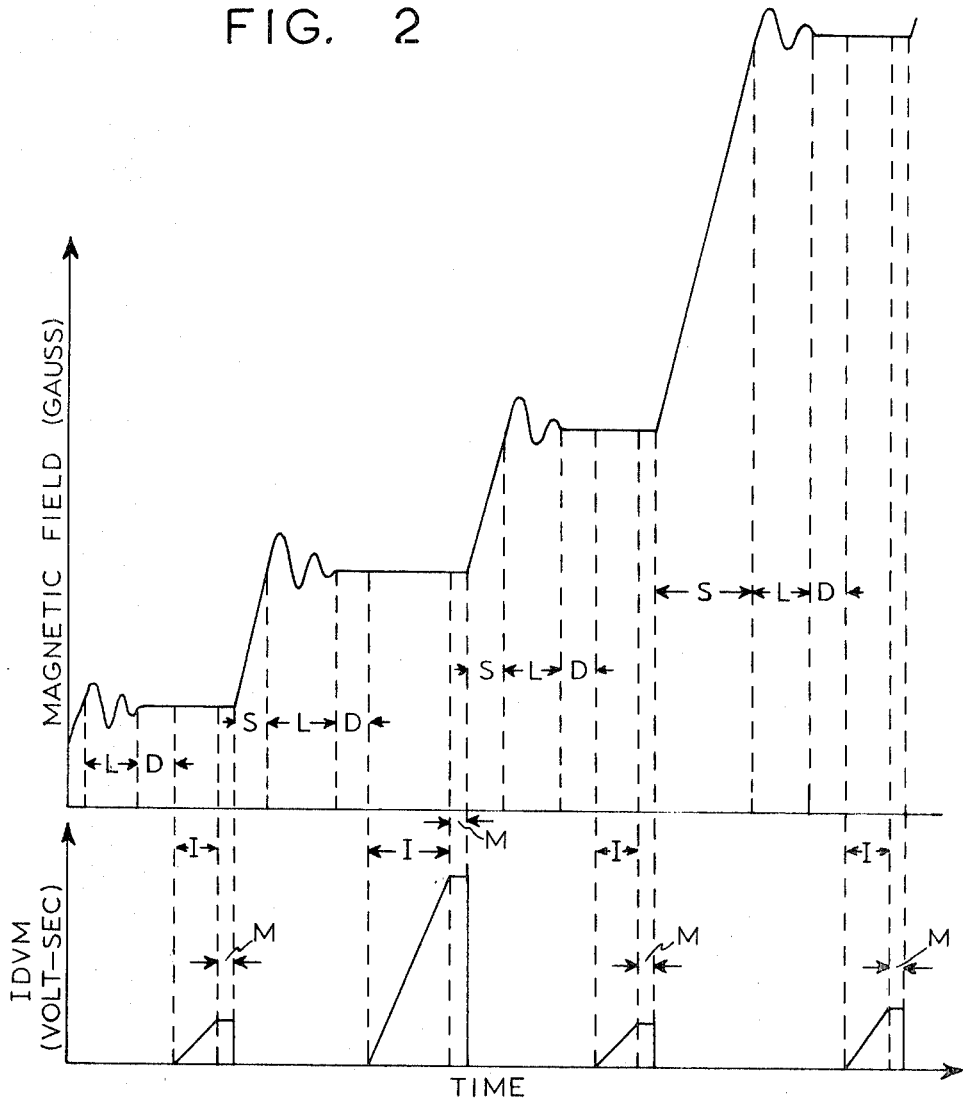
FIG. 2 is a time diagram of a programmed magnetic field and data acquisition system.

A rate coil 36 is wound around the pole 23 so that a changing magnetic field will produce a voltage (EMF) that is also applied to the operational amplifier 33 through a summing resistor 37 to compensate (damp) the original error signal. While slewing, the amplifier 33 become saturated by the very large error signal so that the compensating signal from the rate coil 36 has no effect on the change in the magnetic field. Consequently, the magnetic field will overshoot the programmed value, but then an opposite and much smaller error signal produces an opposite correction. The first and subsequent overcorrection will cause some oscillations for a time defined as the lock-in time L (typically about 0.3 seconds) following each slewing time S as shown in FIG. 2. It is during that time L that the rate signal from the coil 36 becomes effective to damp oscillations.

It should be noted that other techniques for monitoring the magnetic field flux, and the time rate of change of the field flux, have been used, and still other techniques will occur to those skilled in the art. Accordingly, the present invention is not to be construed as limited to the techniques illustrated in the present exemplary embodiment.

As noted hereinbefore, the present system provides for ion current measurement on each side of the programmed peaks. That is illustrated in FIG. 2 for the first peak (selected by a magnetic field of level "1") by a magnetic field of level "$1_o$—" before and "$1_o$+" after the level "1". These levels below and above the peak selecting level for the magnetic field are reached by introducing offset voltages through the switch $S_1$. In the position shown, the switch $S_1$ provides the level "$1_o$—" by subtracting an offset voltage. That is represented by a series connected battery $B_2$ of a polarity which reduces the error signal from the demodulator 32. In the center position, the full error signal produces the field level "1" and in the third position an offset voltage is added by a battery $B_3$ to the field level 1 to provide the level "$1+_o$."

A solenoid 38 energized by a pulse generator 39 steps the switch $S_1$ through its three positions. Thereafter, when the pulse generator 39 is again triggered, a solenoid 40 is energized by a pulse generator 41 via a divider 42 which divides cycles of the pulse generator 39 by three. In that manner the switch $S_2$ is advanced one position for every three advancements of the switch $S_1$. The third advancement of the switch $S_1$ is, of course, to its home position shown.

A zero sensor 43 detects when the magnetic field has reached the new programmed level. Such a zero sensor may be implemented by a zero-crossover detector which detects the first time following each slewing period the error signal crosses zero. A monostable multivibrator included as part of the zero sensor 43 at the output of the zero-crossover detector is then triggered to time a period sufficient for the lock-in time to be complete, plus an additional delay time D (as shown in FIG. 2) which will assure a stable field before ion current measurement with the integrating digital voltmeter 15 is initiated.

Ion current measurement is initiated by the zero sensor 43 at the end of the delay time D. At the same time, measurement of the desired integration time I by a time counter 44, which counts clock pulses from a stable generator 45, is initiated. The integration time is selected by a dial 46 on a time base selector 47 which comprises logic circuits for presetting the time counter 44 to the 2's complement (for a binary counter) or the 10's complement (for a decimal counter) of the count of clock pulses which will make up the total integration time I. That occurs in response to the start signal from the zero sensor 43. When the preset time has been counted, i.e. when the predetermined number of pulses have been counted, a carry is produced as an output signal on a line 48 to stop integration of ion current and trigger the pulse generator 39.

To allow time for the digital memory 16 to respond to that stop signal and read the data from meter 15, the time base selector 47 and a range selector 49, a monostable multivibrator 50 is provided with an RC timing circuit for a period M shown in FIG. 2. When the monostable multivibrator 50 resets, the pulse generator 39 and divider 42 are triggered to initiate slewing to the next magnetic field level. The range selector 49, set by a dial 51, comprises a relay network for setting the combined gain of the electrometer 14 and meter 15 through suitable resistor networks at input stages of each.

It should be noted that greater integration time is desired for ion current measurement at the center of each peak. That may be provided by a programmed logic network which will subtract a selected increment to the 2's or 10's complement used to preset the counter 44 the 2nd, 5th 8th...time. Alternatively, another switch ganged with the switch $S_1$ may be employed to vary the time base selector when it is in the center position, but a programmed logic network is preferred because then the increment can be a different value for each peak.

The lower part of FIG. 2 illustrates schematically the output of the integrating digital voltmeter 15 during data acquisition cycles for one "peak" reading at time $t_2$ and "zero" readings on each side at times $t_1$ and $t_3$. From that it can be seen that after each reading, the integrating digital voltmeter 15 is reset by the multivibrator 50 to prepare it for the next reading.

Figure 3:
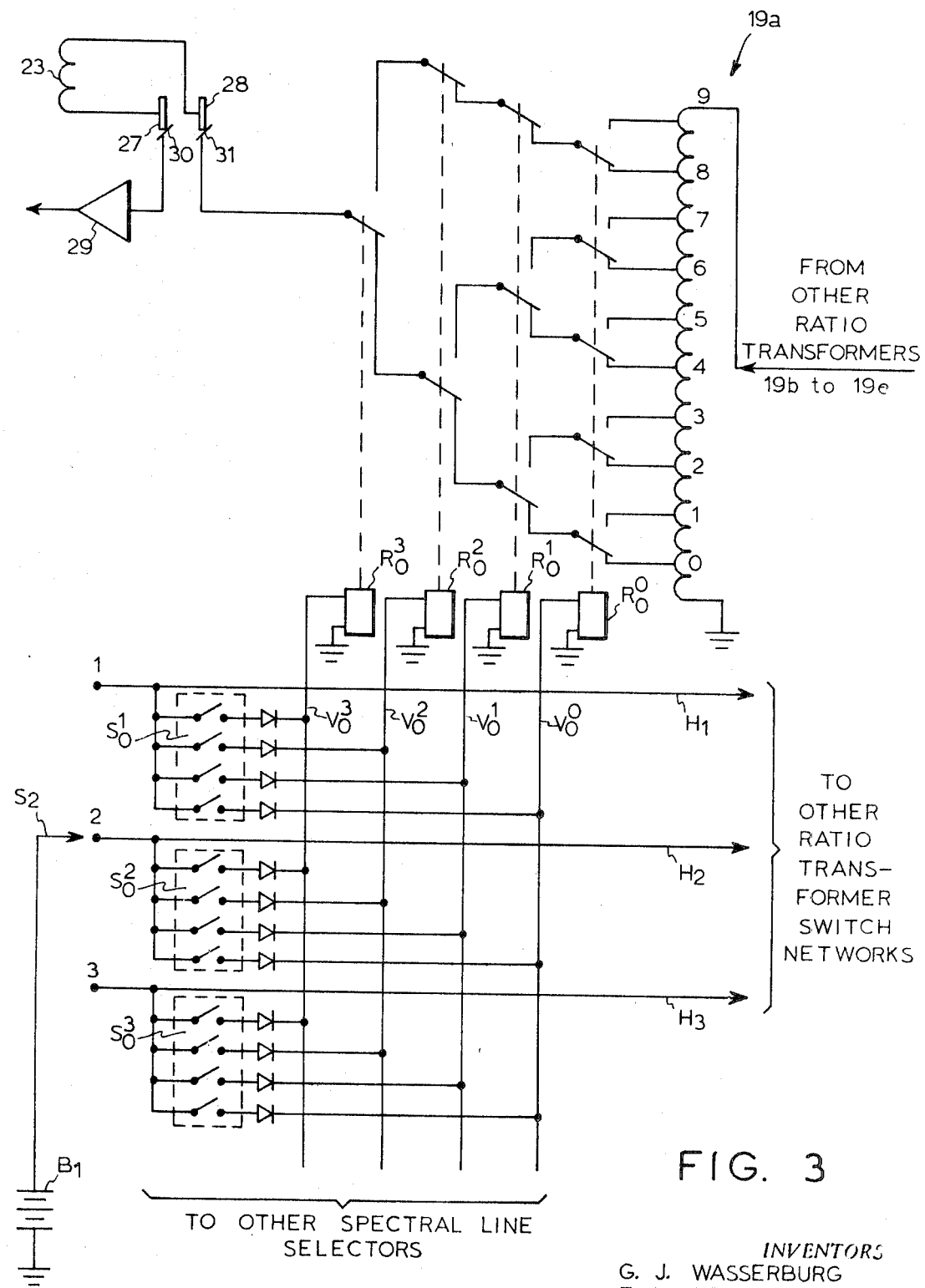
FIG. 3 is a schematic diagram illustrating an exemplary embodiment of a spectral line programmer.

Referring now to FIG. 3, an implementation for the programmer 18 suggested hereinbefore is shown as comprising a relay transfer tree for selecting one of a plurality of taps on a ratio transformer 19a connected to the amplifier 29 via the magnetic field flux monitoring coil 23 connected in series by brushes 30 and 31 on slip rings 27 and 28. By appropriately energizing relays $R^0_0$ to $R^3_0$, any one of 10 taps numbered 0 to 9 may be selected to provide a field control voltage of a value proportional to the position of the tap selected away from ground. Each such value will correspond to the center of a peak, i.e. to the mass number of an isotope expected in a sample.

In order to provide for selection of a mass number from a broad spectrum, and not merely ten as shown in FIG. 3, four more similar ratio transformers 19b to 19e are provided in cascade. Only the ratio transformer 19a for the least significant decimal digit is shown. In that manner $10^5-1$ different field control values may be selected in response to a 5-digit decimal number entered into the programmer through suitable switches in binary coded decimal (BCD) form.

The stepping switch $S_2$ is shown in a position for selecting the second spectral line or peak of a mass spectrum. Accordingly, only the second of a plurality of horizontal lines $H_1$, $H_2$, $H_3$...is energized by the battery $B_1$. A plurality of vertical lines $V^0_0$ to $V^3_0$ complete the matrix for selectively energizing the relays $R^0_0$ to $R^3_0$, where the subscript zero identifies the group of vertical lines with the least significant decimal digit, and the superscripts 0 to 3 identify the individual vertical lines with the associated binary order of a BCD digit entered through a group of BCD switches $S^2_0$, where the subscript zero identifies the group of switches with the vertical lines for the least significant decimal digit and the superscript identifies the group of switches with the horizontal line $H_2$. Diodes are employed to connect all BCD switches to vertical lines to block sneak current paths from any one vertical line to another vertical line that is not to be energized through closed switches of another group of BCD switches not currently selected by the stepping switch $S_2$.

From the foregoing it should be appreciated that the complete programmer 18 of FIG. 1 comprises a matrix of horizontal lines $H_1$ to $H_N$, where N is preferably 9, a plurality of vertical lines $V^0_0$ to $V^3_4$, and a plurality of BCD switches $S^1_0$ to $S^N_4$. Each group of vertical lines has its own relay-selecting tree for selecting taps from a separate ratio transformer. The BCD digit is entered for each group of vertical lines by closing a switch for a binary 1 and opening a switch for a binary 0. Accordingly, to enter the decimal digit 0, all BCD switches are opened to deenergize all relays as shown and thereby select the tap No. 0. To enter the decimal digit 6, for example only the second and third of the BCD switches are closed to select the tap No. 6.

Although one exemplary embodiment has been disclosed for programming the magnetic field of a mass spectrometer in a stepwise fashion and for storing certain data, it is apparent that other embodiments, variations or additional features may be readily provided by one skilled in the art. For example, the encoder may be connected to terminals of the stepping switch $S_2$ to provide a code representative of its position. The position of the stepping switch $S_2$ can then be read into the buffer memory in a coded form by which the other data being read in may be identified. A continuous time clock may also be provided in order that time may be read into the buffer memory with data of each measurement. This would be of particular advantage when the spectrum is scanned repeatedly for a given sample, as is most often done.

In addition, the stepping switch $S_2$ may be modified to scan first in one direction and then in another. That may increase hysteresis effects of the magnetic field control system, but by moving the coil 23 in the air gap of the electromagnet 36, an optimal position may be found which minimizes hysteresis effects to an acceptable level. By thus monitoring the flux locally through the coil 23, good regulation of the final position of the ion beam is achieved at each step, and experience indicates that step scanning in only one direction gives the best reproducibility of the ion beam trajectory.

Still another useful modification is provision for skipping positions of the stepping switch $S_2$. That may be readily accomplished when the stepping switch $S_2$ is implemented with an electronic circuit, such as an electronic ring counter in which stages can be selectively bypassed.

These and other modifications will suggest themselves to those skilled in the art by the particular application or operating environment of the present invention. Accordingly, it is not intended that the scope of the invention be determined by the disclosed exemplary embodiment.

We claim:

1. In a mass spectrometer having a focal plane with a slit and a voltage controlled magnetic field sweep system for scanning N mass peaks, apparatus for step scanning said N mass peaks of a spectrum, comprising:

voltage producing means for producing on demand any one of a plurality reference voltages for said field sweep system, each of said reference voltages being selected to provide through control of said sweep system magnetic fields which will focus ions having the same mass values to pass through said slit, where said values correspond to values at the centers of N mass peaks expected and to values at valleys on both sides of each peak;

sequencing means for demanding in sequence said plurality of reference voltages, in successive order with respect to magnitude whereby 3N magnetic field values are provided for said magnetic field sweep system in a stepwise fashion;

means for stabilizing the magnetic field value of said sweep system produced in response to each reference voltage;

means for cyclically measuring ion beam current produced by ions passing through said slit; and means for initiating each cycle of measurement of ion beam current by said measuring means at each magnetic field value, each measurement being initiated after said stabilizing means has stabilized the magnetic field value of said sweep system produced in response to each reference voltage demanded by said sequencing means.

2. Apparatus as defined in claim 1 wherein:

said voltage producing means comprises means for producing N unique voltages selected to provide through control of said sweep system magnetic fields which will focus ions having the same mass values at said common point, where said N values correspond to said values at different ones of said centers of N mass peaks, and means for providing incremental voltages to be added and subtracted from each of said unique voltages to provide for each of said N unique voltages produced a triad of reference voltages; and said sequencing means comprises means for selecting in sequence said N unique voltages, one unique voltage for every three successive cycles of said measuring means, and means for sequentially subtracting, neither subtracting nor adding, and adding different ones of said incremental voltages to each of said N unique voltages in a given order to provide said triads of reference voltages.

3. Apparatus as defined in claim 2 wherein said stabilizing means comprises:

means for monitoring the flux of said field and producing a first voltage signal having a value proportional to the magnitude of said flux;

means for subtracting said first voltage signal from said reference voltage to produce a control signal for control of said voltage controlled magnetic field sweep system;

means for monitoring the time rate of change of said flux to produce a second voltage signal having a value proportional to said rate of change and a polarity corresponding to the sign of said change; and means responsive to said second voltage signal for damping oscillations in said control signal.

4. Apparatus as defined in claim 3 wherein said measuring means provides an output signal proportional to ion beam current in digital form by integration for a predetermined period of time, and including means for storing said output signal and for simultaneously storing a signal in digital form representing the time of integration.

5. Apparatus of claim 4 wherein said measuring means includes means for scaling said output signal, and said storing means simultaneously stores with each output signal a corresponding scaling factor.

6. Apparatus of claim 5 including a computer connected to said storing means to receive stored data for online processing.

7. In a system for mass spectroscopy having an electromagnet and a collector slit, apparatus comprising;

means for selectively focusing said ion beams to pass through said slit by successively altering the magnetic field of said electromagnet from one value to another at a high rate in a stepwise fashion for each peak of a mass spectrum and for valleys on both sides of each peak to be measured;

means for determining when a static magnetic field has been reached by said focusing means; and means responsive to said determining means for initiating measurement of ion intensity when a static magnetic field has been reached.

8. Apparatus as defined by claim 7 wherein said magnetic field values are selected from predetermined values in successive order from one extreme value to another.

9. Apparatus as defined by claim 8 including:
programming means for selectively predetermining magnetic field values to be selected; and
means for timing a period for measurement of ion intensity at each magnetic field value.

10. In a system for mass spectroscopy having an electromagnet including a gap, and an exciting coil producing a magnetic field in said gap for focusing selected ion beams at the centers of peaks of a spectrum through a collector slit, the combination comprising:
means for producing predetermined reference signals in a stepwise fashion, one reference signal for each selected ion beam;
means responsive to said reference signals for producing field control signals used for controlling current through said exciting coil to establish for each reference signal a triad of magnetic fields of predetermined values in said gap corresponding to focus ions at centers of said selected ion beams to pass through said slit and focus ions on both sides of said selected ion beams to pass through said slit in order to provide background reference measurements on both sides of each selected ion beam against which the true amplitude of a selected ion beam the reference measurements may be determined;
field sensing means for producing a feedback signal proportional to said magnetic field;
means responsive to a given field control signal and said feedback signal for producing an error signal equal to the algebraic difference therebetween; and
a controlled power supply means connected to said exciting coil for varying current through said coil in response to the amplitude and polarity of said error signal in a direction to reduce said error signal.

11. The combination as defined in claim 10 including a rate coil wound around a pole of said electromagnet, the axis of said coil being substantially parallel to flux of said field at the center of said pole, whereby a signal is produced in said rate coil of a polarity and amplitude corresponding to the time rate of change and direction of change of said field, and mans combining said rate signal with said error signal for damping oscillations of said error signal.

12. In a system for mass spectroscopy having an electromagnet for focusing selected ion beams through a collector slit, said electromagnet having an exciting coil, the combination comprising:
means for producing an analog signal as a function of said ion beam intensity focused onto said collector slit;
means for selecting a period of integration of said ion beams;
means for integrating said analog signal for said selected period and for developing in digital form an output signal having a value proportional to the integral of said analog signal over said period;
a buffer memory;
means for transferring to said buffer memory said output in digital form together with the value of the period selected in digital form after said period has lapsed; and
programming means for altering the level of magnetic field current through said exciting coil in a stepwise fashion to rapidly focus another ion beam through said collector slit.

13. The combination as defined in claim 12 wherein said programming means is preset to focus the centers of ion beams of selected mass numbers through said collector slit for spectral line intensity analysis and at separate times both sides of each ion beam of selected mass numbers, thereby providing background level analysis to be used in spectral line intensity analysis.

14. The combination as defined in claim 12 wherein said programming means is preset to focus the centers of ion beams of selected mass numbers through said collector slit by programmed reference signals, and preset to focus the ion beams on both sides of the centers of each ion beam corresponding to a selected mass number by at one time subtracting and another time adding predetermined signal increments to each of said reference signals.

15. The combination of claim 14 wherein said programmed reference signals are selected by a first switching means, and predetermined signal increments are added and subtracted by a second switching means, said second switching means being actuated each time said third means transfers a digital output signal to said buffer memory to subtract an incremental signal at one time, to add an incremental signal at another signal at a time intermediate said one time and said another time for a given reference signal corresponding to one mass number.